United States Patent
Tang et al.

(10) Patent No.: US 11,785,585 B2
(45) Date of Patent: *Oct. 10, 2023

(54) METHOD AND DEVICE FOR DETERMINING DETECTION RANGE OF CONTROL CHANNEL IN MULTI-BEAM SYSTEM

(71) Applicant: GUANGDONG OPPO MOBILE TELECOMMUNICATIONS CORP., LTD., Guangdong (CN)

(72) Inventors: Hai Tang, Guangdong (CN); Hua Xu, Ottawa (CA)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/465,756

(22) Filed: Sep. 2, 2021

(65) Prior Publication Data

US 2021/0400666 A1    Dec. 23, 2021

Related U.S. Application Data

(63) Continuation of application No. 16/494,561, filed as application No. PCT/CN2017/077850 on Mar. 23, 2017, now Pat. No. 11,140,680.

(51) Int. Cl.
*H04W 72/0446* (2023.01)
*H04B 7/06* (2006.01)
*H04W 72/23* (2023.01)

(52) U.S. Cl.
CPC ...... *H04W 72/0446* (2013.01); *H04B 7/0617* (2013.01); *H04W 72/23* (2023.01)

(58) Field of Classification Search
CPC .......... H04W 72/0446; H04W 72/042; H04B 7/0617
See application file for complete search history.

(56) References Cited

U.S. PATENT DOCUMENTS 9,184,806 B2 * 11/2015 Kim .................. H04B 7/0639
11,140,680 B2 * 10/2021 Tang ................ H04W 72/0446
(Continued)

FOREIGN PATENT DOCUMENTS

CN    102083226 A    6/2011
CN    102740473 A    10/2012
(Continued)

OTHER PUBLICATIONS

Australian First Examination Report for AU Application 2017405463 dated Dec. 3, 2021. (3 pages).
(Continued)

*Primary Examiner* — Kashif Siddiqui
(74) *Attorney, Agent, or Firm* — Young Basile Hanlon & MacFarlane, P.C.

(57) ABSTRACT

Provided are a method and device for determining a detection range for a control channel in a multi-beam system. The method includes a network device sends configuration information to a terminal device, wherein the configuration information is used for the terminal device to determine a time domain resource in which control channel detection is required within a target downlink time period according to the configuration information, and the time domain resource includes multiple time domain scheduling units. According to the method for determining the detection range for the control channel in the multi-beam system of the embodiment of the present application, the terminal device only needs to perform the detection of control channel on the time domain resource determined according to the configuration information, and those time domain resources on which a control (Continued)

100

A network device sends configuration information to a terminal device, the configuration information is used for the terminal device to determine a time domain resource in which control channel detection is required within a target downlink time period according to the configuration information, and the time domain resource includes multiple time domain scheduling units ～ S110 channel of a current beam is determined not to exist, may be excluded through the configuration information.

12 Claims, 10 Drawing Sheets

(56) References Cited

U.S. PATENT DOCUMENTS

| | | | | |
|---|---|---|---|---|
| 2017/0311301 | A1* | 10/2017 | Yu | H04W 72/042 |
| 2019/0157770 | A1* | 5/2019 | Park | H04W 72/0446 |
| 2019/0166610 | A1* | 5/2019 | Lee | H04W 72/046 |
| 2019/0349160 | A1* | 11/2019 | Gou | H04W 76/27 |

FOREIGN PATENT DOCUMENTS

| | | |
|---|---|---|
| CN | 103765792 A | 4/2014 |
| CN | 104885377 A | 9/2015 |
| CN | 105210342 A | 12/2015 |
| CN | 106454901 A | 2/2017 |
| EP | 2996296 A1 | 3/2016 |
| JP | 2016506667 A | 3/2016 |
| KR | 20140081754 A | 7/2014 |
| RU | 2438260 C2 | 12/2011 |
| RU | 2518966 C1 | 6/2014 |
| WO | 2008013173 A1 | 1/2008 |
| WO | 2014098542 A1 | 6/2014 |

OTHER PUBLICATIONS

Indonesia Examination Report with English Translation for ID Application P00201909340 dated Dec. 24, 2021. (10 pages).
Chile Office Action with English Translation for CL Application 2019002667 dated Jul. 20, 2021. (40 pages).
Japanese Office Action with English Translation for JP Application 2019551322 dated Oct. 5, 2021. (5 pages).
Israel Office Action with English Translation for IL Application 269384 dated Feb. 16, 2022. (3 pages).
Australian Examination Report for AU Application 2017405463 dated May 9, 2022. (3 pages).
Extended EP Search Report for EP application 17902245.4 dated Feb. 25, 2020.
3GPP TSG-RAN WG1#87; Reno, U.S.A., Nov. 14-18, 2016; R1-1612863.
3GPP TSG-RAN WG1 #88; Athens, Greece, Feb. 13-17, 2017; R1-1703043.
RU Notice of Allowance for Application No. 2019132847/07 (064667) dated Mar. 23, 2017.
3GPP TSG RAN WG1 Meeting #88bis; Spokane, USA, Apr. 3-7, 2017; R1-1704172.
Canada First Office Action for CA Application 3,057,046 dated Nov. 10, 2020.
Singapore Written Opinion for SG Application 11201908643V dated Nov. 17, 2020.
China First Office Action with English Translation for CN Application 201911329384.0 dated Nov. 3, 2020.
Chile Office Action with English Translation for CL Application 2019-002667 dated Oct. 20, 2020.
Korea First Office Action with English Translation for KR Application 10-2019-7027151 dated Jan. 22, 2021. (12 pages).
Japan First Office Action with English translation for JP Application 2019-551322 dated Mar. 30, 2021. (6 pages).
Intel Corporation, NR Synchronization Signal Time Indexing, 3GPP TSG RAN WG1 Meeting RAN1 #88, R1-1702177, Feb. 13-17, 2017. (3 pages).
Extended European Search Report for EP Application 21167419.7 dated Jul. 9, 2021. (11 pages).
Indian Examination Report for IN Application 201917038144 dated Jun. 8, 2021. (6 pages).
Korean Grant of Patent with English Translation for KR Application 10-2019-7027151 dated Jul. 8, 2021. (4 pages).
Taiwan Office Action with English Translation for TW Application 107109449 dated May 17, 2021. (16 pages).
International Search Report with English Translation for PCT/CN2017/077850 dated Dec. 8, 2017.
Chinese First Office Action with English Translation for CN Application 201780088620.7 dated Jul. 29, 2023. (15 pages).
Vietnam Substantive Examination Report with English Translation for VN Application 1201905725 dated Jun. 7, 2023. (4 pages).

* cited by examiner

100

A network device sends configuration information to a terminal device, the configuration information is used for the terminal device to determine a time domain resource in which control channel detection is required within a target downlink time period according to the configuration information, and the time domain resource includes multiple time domain scheduling units ~ S110

FIG. 1

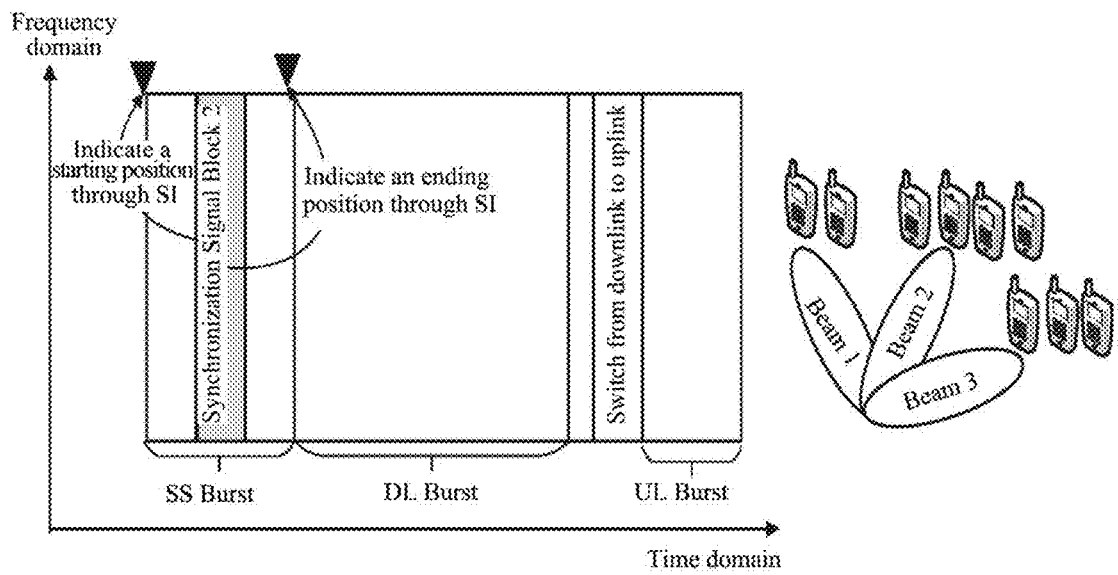

A terminal device receives configuration information sent by a network device, and the configuration information is used for the terminal device to determine a time domain resource in which control channel detection is required within a target downlink time period according to the configuration information — S210

The terminal device determines the time domain resource in which the control channel detection is required within the target downlink time period according to the configuration information, and the time domain resource includes multiple time domain scheduling units — S220

FIG. 12

METHOD AND DEVICE FOR DETERMINING DETECTION RANGE OF CONTROL CHANNEL IN MULTI-BEAM SYSTEM

CROSS-REFERENCE TO RELATED APPLICATION(S)

This application is a continuation application of a U.S. patent application Ser. No. 16/494,561 filed on Sep. 16, 2019, which is a 371 of International PCT Application No. PCT/CN 2017/077850 filed on Mar. 23, 2017. The entire contents of the above-identified applications are incorporated herein by reference.

TECHNICAL FIELD

Implementations of the present disclosure relate to the field of communication, and more particularly, to a method and device for determining a detection range for a control channel in a multi-beam system.

BACKGROUND

In a Long Term Evolution (LTE) system, a time domain position of a downlink control channel (PDCCH) is completely fixed, and is located in first few symbols of each 1 ms subframe. A terminal device may receive the PDCCH only by a blind detection in these symbols.

However, a future communication system (e.g., 5$^{th}$ Generation, 5G) will introduce a multi-beam technology in a high frequency band (>6 GHz), i.e., a base station will transmit signals of multiple beams alternately in a time division manner, and only certain beams in each time unit will transmit signals to concentrate energies and expand coverage. Therefore, in one time period, there will be transmission periods of multiple PDCCHs and corresponding Physical Downlink Shared Channels (PDSCHs), and both start time and duration of PDCCH/PDSCH of each beam are flexible, which results that a terminal device needs to detect a PDCCH in the whole time domain. This will lead to higher complexity of the terminal device and increase battery power consumption of the terminal device.

Therefore, it is necessary to provide a method for determining a detection range for a control channel in a multi-beam system, so as to reduce the complexity and the battery power consumption of the terminal device.

SUMMARY

The present disclosure provides a method and device for determining a detection range for a control channel in a multi-beam system.

In a first aspect, there is provided a method for determining a detection range for a control channel in a multi-beam system, including: sending, by a network device, configuration information to a terminal device, wherein the configuration information is used for the terminal device to determine a time domain resource in which control channel detection is required within a target downlink time period according to the configuration information, wherein the time domain resource includes multiple time domain scheduling units.

According to the method for determining the detection range for the control channel in the multi-beam system of the present disclosure, the network device sends the configuration information to the terminal device, so that the terminal device may determine the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources.

In combination with the first aspect, in one implementation of the first aspect, the configuration information is used for indicating a first time domain resource within the target downlink time period, the first time domain resource includes multiple first sub-time domain resources, and each first sub-time domain resource does not include a synchronization signal or a broadcast channel.

In combination with the first aspect and the implementation thereof, in another implementation of the first aspect, time domain resources except the first time domain resource within the target downlink time period all include a synchronization signal and a broadcast channel; wherein, sending, by the network device, the configuration information to the terminal device, includes: sending, by the network device, system information to the terminal device, wherein the system information includes the configuration information; or, sending, by the network device, the configuration information to the terminal device through a broadcast channel.

In combination with the first aspect and the implementation thereof, in another implementation of the first aspect, partial time domain resources in time domain resources except the first time domain resource within the target downlink time period do not include a synchronization signal or a broadcast channel; wherein, sending, by the network device, the configuration information to the terminal device, includes: sending, by the network device, a high layer signaling to the terminal device, wherein the high layer signaling includes the configuration information; or, sending, by the network device, downlink control information (DCI) to the terminal device, wherein the DCI includes the configuration information; or, sending, by the network device, the configuration information to the terminal device through a downlink control channel or a downlink data channel.

In combination with the first aspect and the implementation thereof, in another implementation of the first aspect, the multiple first sub-time domain resources are continuous; or at least two of the multiple first sub-time domain resources are discontinuous.

In combination with the first aspect and the implementation thereof, in another implementation of the first aspect, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

In combination with the first aspect and the implementation thereof, in another implementation of the first aspect, the ending position information may indicate the ending position by indicating a time domain position of a switching point from downlink to uplink.

In combination with the first aspect and the implementation thereof, in another implementation of the first aspect, at least two pieces of information among information for carrying the starting position information, information for carrying the time domain length information, and information for carrying the ending position information are different; or, at least two channels among a channel for carrying the starting position information, a channel for carrying the time domain length information, and a channel for carrying the ending position information are different.

In combination with the first aspect and the implementation thereof, in another implementation of the first aspect, the configuration information is used for indicating a second time domain resource within the target downlink time period, and the second time domain resource includes a synchronization signal and a broadcast channel.

In combination with the first aspect and the implementation thereof, in another implementation of the first aspect, no synchronization signal or broadcast channel is included in time domain resources except the second time domain resource within the target downlink time period.

In a second aspect, there is provided a method for determining a detection range for a control channel in a multi-beam system, including: receiving, by a terminal device, configuration information sent by a network device, wherein the configuration information is used for the terminal device to determine a time domain resource in which control channel detection is required within a target downlink time period according to the configuration information; and determining, by the terminal device, the time domain resource in which the control channel detection is required within the target downlink time period according to the configuration information, wherein the time domain resource includes multiple time domain scheduling units.

According to the method for determining the detection range for the control channel in the multi-beam system according to the present disclosure, the terminal device receives the configuration information sent by the network device and determines the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources.

In combination with the second aspect, in one implementation of the second aspect, the configuration information is used for indicating a first time domain resource within the target downlink time period, the first time domain resource includes multiple first sub-time domain resources, and each first sub-time domain resource does not include a synchronization signal or a broadcast channel; wherein, determining, by the terminal device, the time domain resource in which the control channel detection is required within the target downlink time period according to the configuration information, includes: determining, by the terminal device, the first time domain resource as the time domain resource in which the control channel detection is required.

In combination with the second aspect and the implementation thereof, in another implementation of the second aspect, time domain resources except the first time domain resource within the target downlink time period all include a synchronization signal and a broadcast channel; wherein receiving, by the terminal device, the configuration information sent by the network device includes: receiving, by the terminal device, system information sent by the network device, wherein the system information includes the configuration information; or, receiving, by the terminal device, the configuration information sent by the network device through a broadcast channel.

In combination with the second aspect and the implementation thereof, in another implementation of the second aspect, partial time domain resources in time domain resources except the first time domain resource within the target downlink time period do not include a synchronization signal or a broadcast channel; wherein receiving, by the terminal device, the configuration information sent by the network device includes: receiving, by the terminal device, a high layer signaling sent by the network device, wherein the high layer signaling includes the configuration information; or, receiving, by the terminal device, downlink control information (DCI) sent by the network device, wherein the DCI includes the configuration information; or, receiving, by the terminal device, the configuration information sent by the network device through a downlink control channel or a downlink data channel.

In combination with the second aspect and the implementation thereof, in another implementation of the second aspect, the multiple first sub-time domain resources are continuous; or at least two of the multiple first sub-time domain resources are discontinuous.

In combination with the second aspect and the implementation thereof, in another implementation of the second aspect, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

In combination with the second aspect and the implementation thereof, in another implementation of the second aspect, the ending position information may indicate the ending position by indicating a time domain position of a switching point from downlink to uplink, and the method further includes: determining, by the terminal device, the time domain position of the switching point from the downlink to the uplink as the ending position of the first time domain resource.

In combination with the second aspect and the implementation thereof, in another implementation of the second aspect, at least two pieces of information among information for carrying the starting position information, information for carrying the time domain length information, and information for carrying the ending position information are different; or, at least two channels among a channel for carrying the starting position information, a channel for carrying the time domain length information, and a channel for carrying the ending position information are different.

In combination with the second aspect and the implementation thereof, in another implementation of the second aspect, the configuration information is used for indicating a second time domain resource within the target downlink time period, and the second time domain resource includes a synchronization signal and a broadcast channel; wherein, determining, by the terminal device, the time domain resource in which the control channel detection is required within the target downlink time period according to the configuration information, includes: determining, by the terminal device, a time domain resource except the second time domain resource within the target downlink time period as the time domain resource in which the control channel detection is required.

In combination with the second aspect and the implementation thereof, in another implementation of the second aspect, no synchronization signal or broadcast channel is included in time domain resources except the second time domain resource within the target downlink time period.

In a third aspect, a network device is provided for performing the method in the first aspect or any possible implementation of the first aspect. Specifically, the network device includes function modules for executing the method in the first aspect or in any possible implementation of the first aspect.

In a fourth aspect, a terminal device is provided or performing the method in the second aspect or any possible implementation of the second aspect. Specifically, the terminal device includes function modules for executing the method in the second aspect or in any possible implementation of the second aspect.

In a fifth aspect, a network device is provided. The network device includes a processor, a memory, and a transceiver. The processor, the memory, and the transceiver communicate with each other through internal connection paths to transfer control and/or data signals so that the network device executes the method in the first aspect or any possible implementation of the first aspect.

In a sixth aspect, a terminal device is provided. The terminal device includes a processor, a memory, and a transceiver. The processor, the memory, and the transceiver communicate with each other through internal connection paths to transfer control and/or data signals so that the terminal device executes the method in the second aspect or any possible implementation of the second aspect.

In a seventh aspect, a computer readable medium is provided for storing a computer program. The computer program includes instructions used for executing the first aspect or any possible implementation of the first aspect.

In an eighth aspect, a computer readable medium is provided for storing a computer program. The computer program includes instructions used for executing the second aspect or any possible implementation of the second aspect.

BRIEF DESCRIPTION OF DRAWINGS

FIG. 1 is a schematic flow chart for determining a detection range for a control channel in a multi-beam system according to an implementation of the present disclosure.

FIG. 11 is a schematic diagram of a method for determining a detection range for a control channel in a multi-beam system according to yet another implementation of the present disclosure.

FIG. 12 is a schematic flow chart of a method for determining a detection range for a control channel in a multi-beam system according to yet another implementation of the present disclosure.

DETAILED DESCRIPTION

Figure 2:
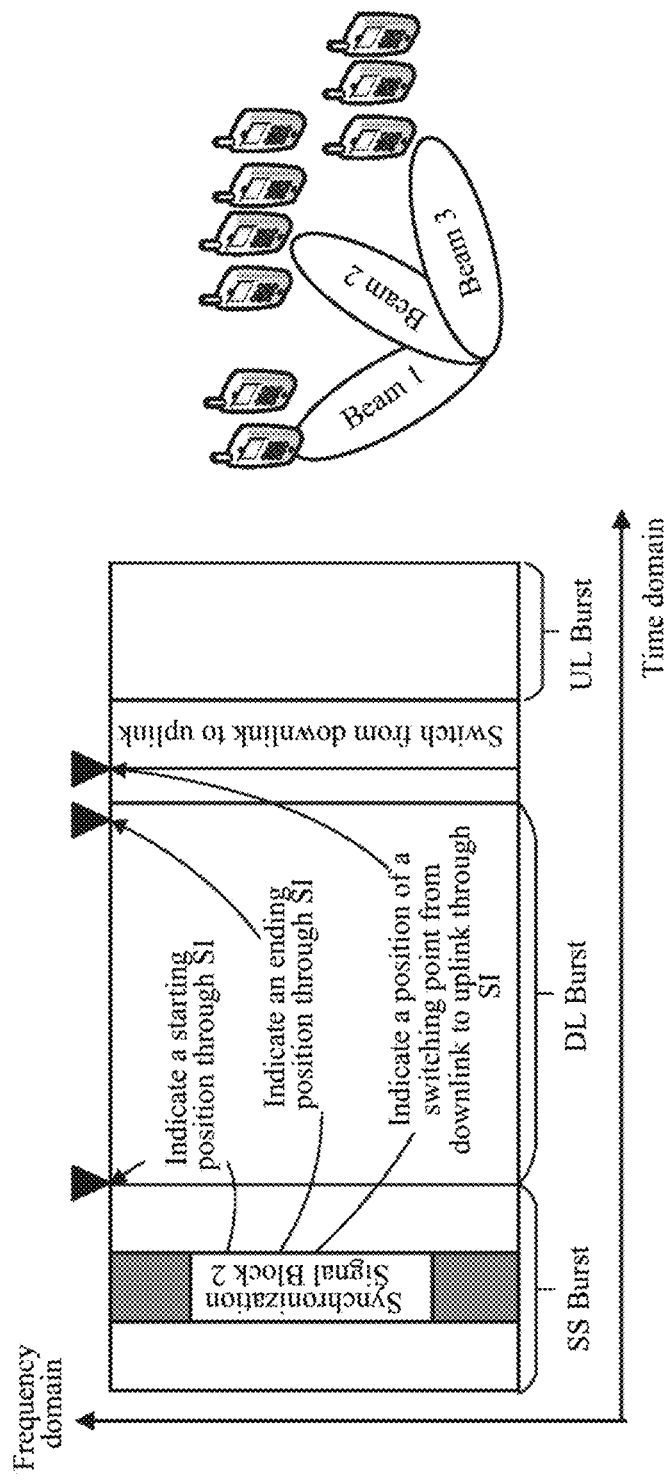
FIG. 2 is a schematic diagram of a method for determining a detection range for a control channel in a multi-beam system according to another implementation of the present disclosure.

Technical solutions in implementations of the present disclosure will be clearly and completely described below with reference to the drawings in the implementations of the present disclosure.

The technical solutions of the implementations of the present disclosure may be applied to various communication systems, such as, a Global System of Mobile communication (GSM) system, a Code Division Multiple Access (CDMA) system, a Wideband Code Division Multiple Access (WCDMA) system, General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS) or a Worldwide Interoperability for Microwave Access (WiMAX) communication system, a future Fifth-Generation (5G) system, or a New Radio (NR) system.

In the implementations of the present disclosure, a terminal device may include, but not limited to, a Mobile Station (MS), a mobile terminal, a mobile phone, a User Equipment (UE), a handset, a portable equipment, or a vehicle, and so on. The terminal device may communicate with one or more core networks through a radio access network (RAN). For example, the terminal device may be a mobile phone (or referred to as "cellular" phone), or a computer with wireless communication functions, or the terminal device may be a portable, pocket, handheld, computer built-in, or vehicle-mounted mobile apparatus.

A network device involved in the implementations of the present disclosure is an apparatus deployed in a wireless access network to provide wireless communication functions for a terminal device. The network device may be a base station, which may include various forms of macro base stations, micro base stations, relay stations, access points, etc. In systems adopting different radio access technologies, names of devices with functionality of a base station may be different. For example, in an LTE network, it is called evolved NodeB (eNB or eNodeB), and in a 3rd Generation (3G) network, it is called Node B.

FIG. 1 shows a method for determining a detection range for a control channel in a multi-beam system according to an implementation of the present disclosure. As shown in FIG. 1, the method 100 includes act S110.

In S110, a network device sends configuration information to a terminal device, the configuration information is used for the terminal device to determine a time domain resource in which control channel detection is required within a target downlink time period according to the configuration information, and the time domain resource includes multiple time domain scheduling units.

According to the method for determining the detection range for the control channel in the multi-beam system of the implementation of the present disclosure, the network device sends the configuration information to the terminal device, so that the terminal device may determine the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of current beam is determined not to exist, may be excluded through the configuration information, so that the terminal device avoids detecting these time domain resources, thereby reducing the complexity and the battery power consumption of the terminal device.

It should be noted that a time domain scheduling unit in S110 refers to a slot or a mini-slot.

Optionally, in S110, the configuration information is used for indicating a first time domain resource within a target downlink time period, the first time domain resource includes multiple first sub-time domain resources, and each first sub-time domain resource does not include a synchronization signal or a broadcast channel.

Optionally, the multiple first sub-time domain resources are continuous; or at least two of the multiple first sub-time domain resources are discontinuous.

Further, time domain resources except the first time domain resource within the target downlink time period all include a synchronization signal and a broadcast channel. That is, the first time domain resource includes all time domain resources that do not include a synchronization signal or a broadcast channel within the target downlink time period. In this case, a network device may send configuration information to a terminal device through system information. Or, the network device sends configuration information to the terminal device through a broadcast channel.

Moreover, in some implementations, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

Optionally, as one implementation, the ending position information may indicate the ending position by indicating a time domain position of a switching point from downlink to uplink.

Optionally, the starting position and/or time domain length and/or ending position may be in a unit of a slot and/or a mini-slot and/or a symbol. Or the starting position and/or ending position may be a relative position with respect to a certain synchronization signal or broadcast channel, or may be a relative position with respect to a subframe or a slot boundary. The time domain position of the switching point from downlink to uplink may be in a unit of a slot and/or a mini-slot and/or a symbol.

Figure 3:
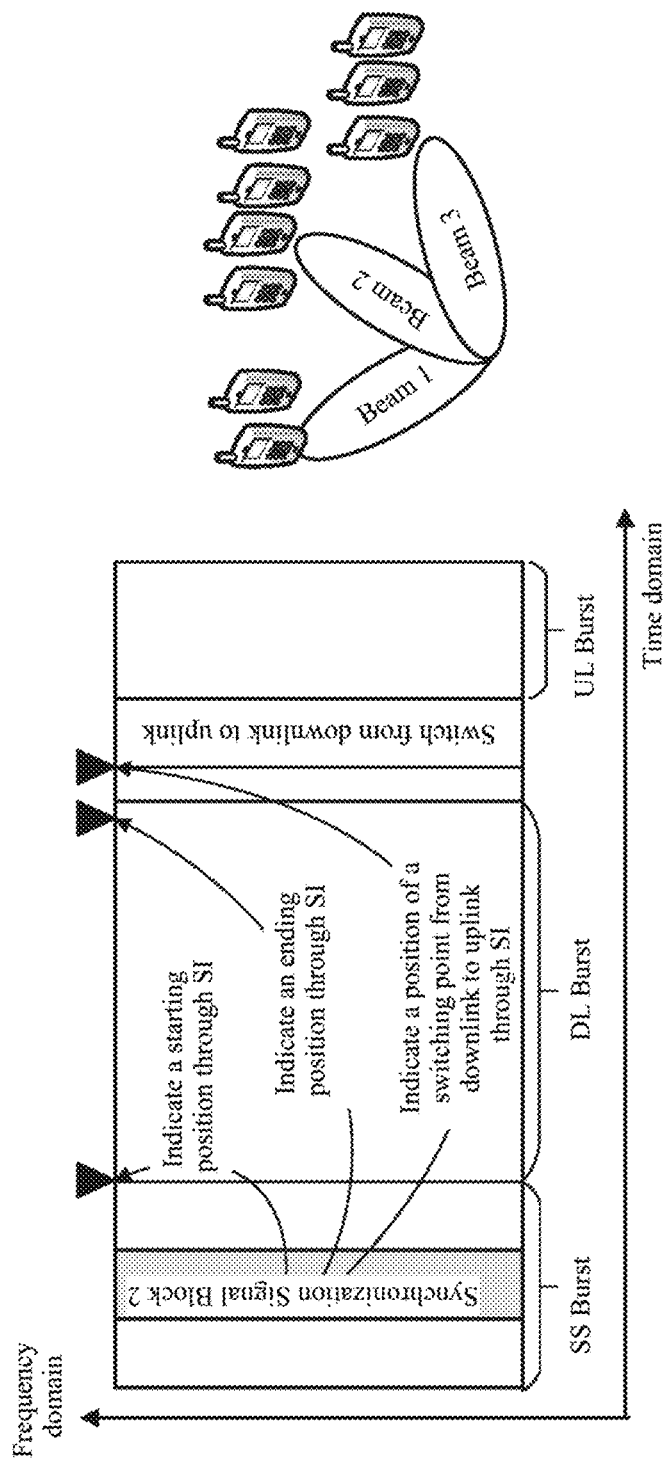
FIG. 3 is a schematic diagram of a method for determining a detection range for a control channel in a multi-beam system according to yet another implementation of the present disclosure.

For example, assuming that a network device sends a signal to a terminal device through three beams, and a Synchronization Signal (SS) Block 1, SS Block 2, and SS Block 3 constitute an SS Burst. As shown in FIG. 2, a SS block may not connect pure data time periods before and after, or as shown in FIG. 3, a SS Block connects pure data time periods before and after. The network device sends configuration information through System Information (SI) in a Physical Broadcast Channel (PBCH) or a Physical Downlink Shared Channel (PDSCH) in the SS Block 2, to indicate which time domain resources do not include a SS Block, i.e. a range of Downlink (DL) Burst, during a downlink time period shown in FIG. 2 or FIG. 3. Specifically, the configuration information indicates a starting point and/or an ending point of the DL Burst and/or a switching point from downlink to uplink, and after the switching point from the downlink to the uplink, uplink transmission will be performed, which corresponds to a uplink (UL) Burst. It may be understood that, when the DL Burst extends to end of the entire downlink time period, indicating a position of the switching point from downlink to uplink is equivalent to indicating an ending position of the DL Burst.

It should be noted that the manner of sending configuration information through system information usually indicates a time domain range of the entire DL Burst, i.e. all time domain resources that do not include a SS Block. And the network device sending configuration information through system information may inform all terminal devices of the whole beam of a time domain resource which does not include a SS Block in a broadcast manner. However, since the system information may only be updated semi-statically, the manner of sending configuration information through system information is more suitable for a scene with a semi-static change in a time domain resource which does not include a SS Block, for example, a scene with fixed or a semi-static change in a time domain resource which does not include a SS Block of which a starting position is mainly affected by a length of a SS Burst.

In the implementation of the present disclosure, optionally, partial time domain resources in time domain resources except the first time domain resource within the target downlink time period do not include a synchronization signal or a broadcast channel. That is, the first time domain resource may include a part of time domain resources that do not include a synchronization signal or a broadcast channel within the target downlink time period. In this case, the network device sends configuration information to the terminal device through a high layer signaling (for example, a Radio Resource Control (RRC) signaling) or Downlink Control Information (DCI). Or the network device sends configuration information to the terminal device through a downlink control channel or a downlink data channel.

It should be noted that, in a case that the first time domain resource includes the part of the time domain resources that do not include the synchronization signal or the broadcast channel within the target downlink time period, for the entire cell, time domain resources for a terminal device that has not received the configuration information to perform control channel detections are all time domain resources that do not include a synchronization signal or a broadcast channel within the target downlink time period, while a time domain resource for the terminal device that has received the configuration information to perform control channel detection is the first time domain resource indicated by the configuration information.

Figure 4:
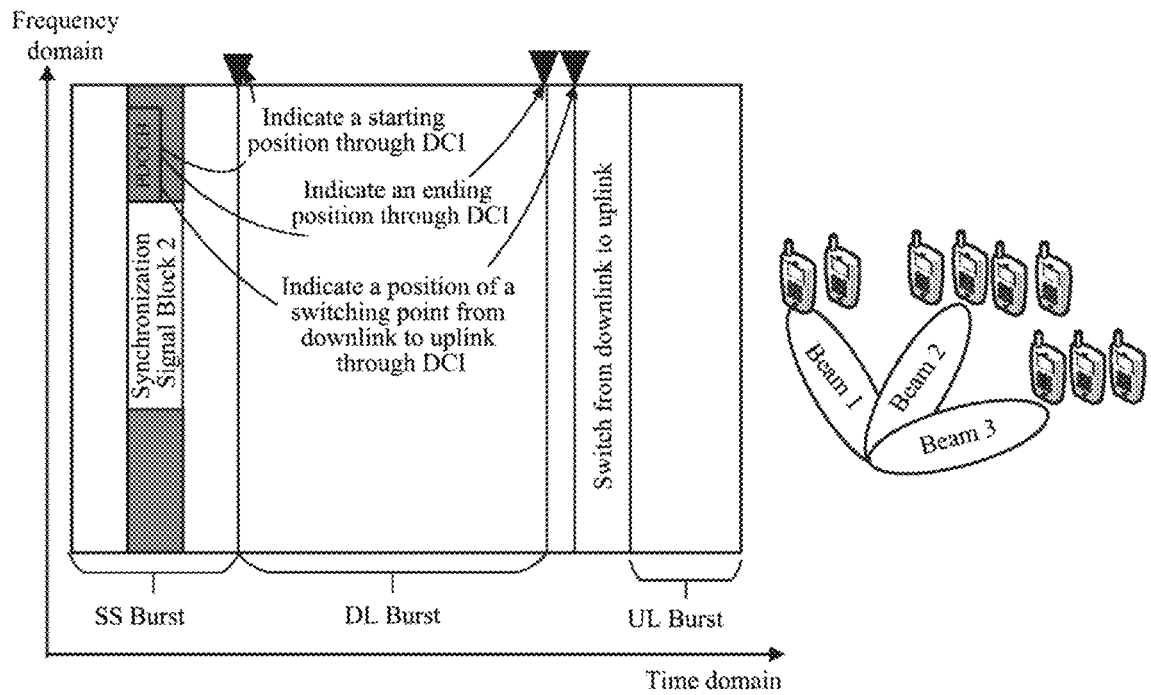
FIG. 4 is a schematic diagram of a method for determining a detection range for a control channel in a multi-beam system according to yet another implementation of the present disclosure.
Figure 5:
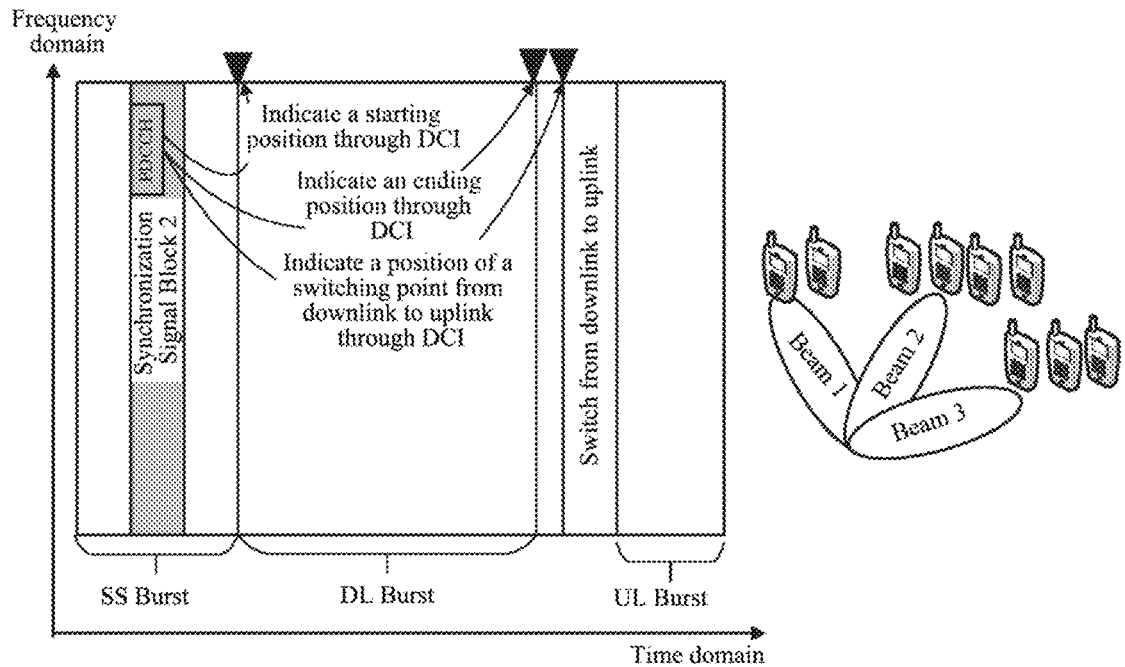
FIG. 5 is a schematic diagram of a method for determining a detection range for a control channel in a multi-beam system according to yet another implementation of the present disclosure.

For example, assuming that a network device sends a signal to a terminal device through three beams, SS Block 1, SS Block 2, and SS Block 3 constitute a SS Burst. As shown in FIG. 4, a SS block may not connect pure data time periods before and after, or as shown in FIG. 5, a SS Block connects pure data time periods before and after. The network device sends the configuration information through DCI and may indicate a time domain range of the entire DL Burst or a part of a range of the DL Burst. It may be understood that the network device sending the configuration information through the DCI may inform a specific terminal device of a time domain resource which does not include a SS Block in a unicast manner, so that the specific terminal device performs control channel detection on a time domain resource indicated by the configuration information. Moreover, since the DCI may be dynamically updated, the method of sending configuration information through DCI is more suitable for a scene with a dynamic change in a time domain resource which does not include a SS Block, such as a scene with a change in a position of an ending point of a time domain resource which does not include a SS Block or a position of a switching point from downlink to uplink.

Figure 6:
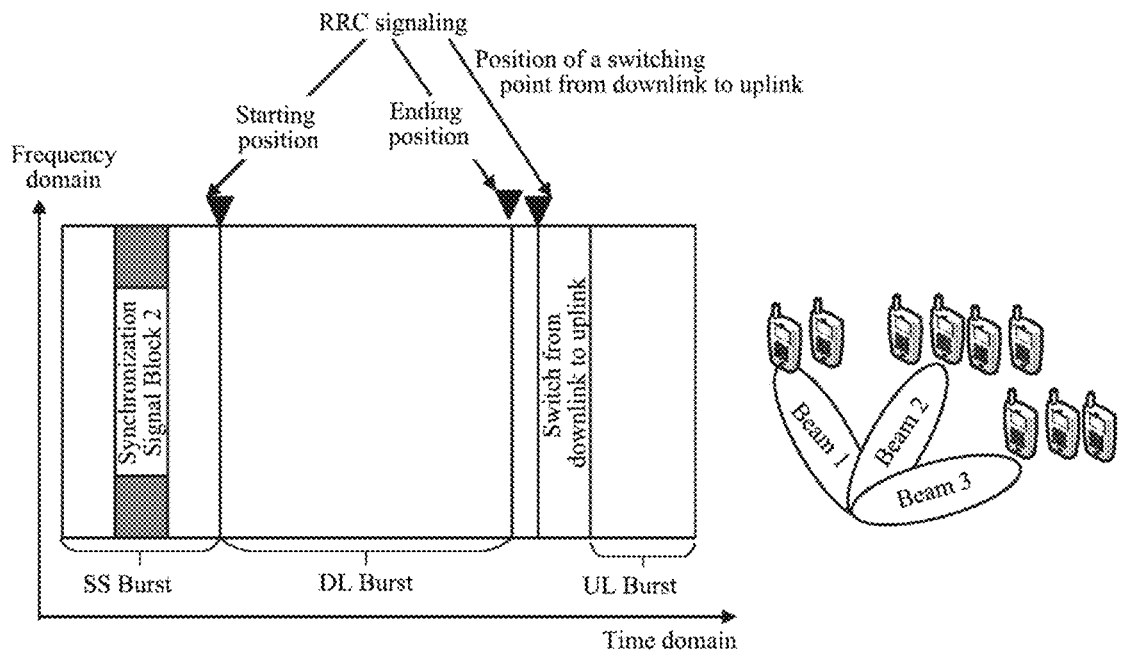
FIG. 6 is a schematic diagram of a method for determining a detection range for a control channel in a multi-beam system according to yet another implementation of the present disclosure.
Figure 7:
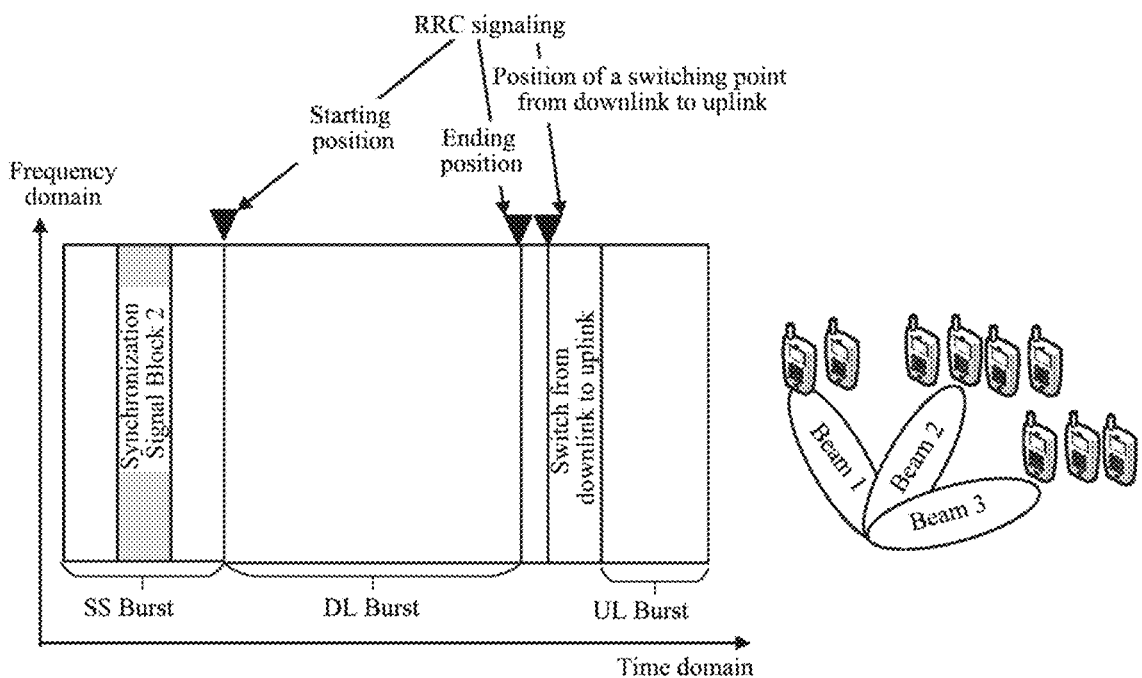
FIG. 7 is a schematic diagram of a method for determining a detection range for a control channel in a multi-beam system according to yet another implementation of the present disclosure.

Or, assuming that a network device sends a signal to a terminal device through three beams, SS Block 1, SS Block 2, and SS Block 3 constitute a SS Burst. As shown in FIG. 6, a SS block may not connect pure data time periods before and after, or as shown in FIG. 7, a SS Block connects pure data time periods before and after. The network device sends configuration information through an RRC signaling. The network device may indicate a time domain range of the entire DL Burst through the RRC signaling, and may indicate a part of a range of the DL Burst. Similarly, the network device sending configuration information through the RRC signaling may inform a specific terminal device of a time domain resource which does not include a SS Block in a unicast manner, and the specific terminal device performs the detection of control channel on a time domain resource indicated by the configuration information. Similar to the method of sending the configuration information through the SI, an RRC signaling may only be updated semi-statically, so the method of sending the configuration information through the RRC signaling is more suitable for a scene with a semi-static changes in a time domain resource that does not include a SS Block, for example, a scene with fixed or a semi-static change in a time domain resource which does not include a SS Block of which a starting position is mainly affected by a length of a SS Burst.

In the implementation of the present disclosure, optionally, at least two pieces of information among information for carrying the starting position information, information for carrying the time domain length information, and information for carrying the ending position information are different. That is, the starting position information, the time domain length information, and the ending position information may be sent through different types of information. For example, starting point position information is sent through SI or an RRC signaling, and time domain length information and ending point position information are sent through DCI.

Or, at least two channels among a channel for carrying the starting position information, a channel for carrying the time domain length information, and a channel for carrying the ending position information are different. That is, the starting position information, the time domain length information, and the ending position information may be sent through different channels.

Figure 8:
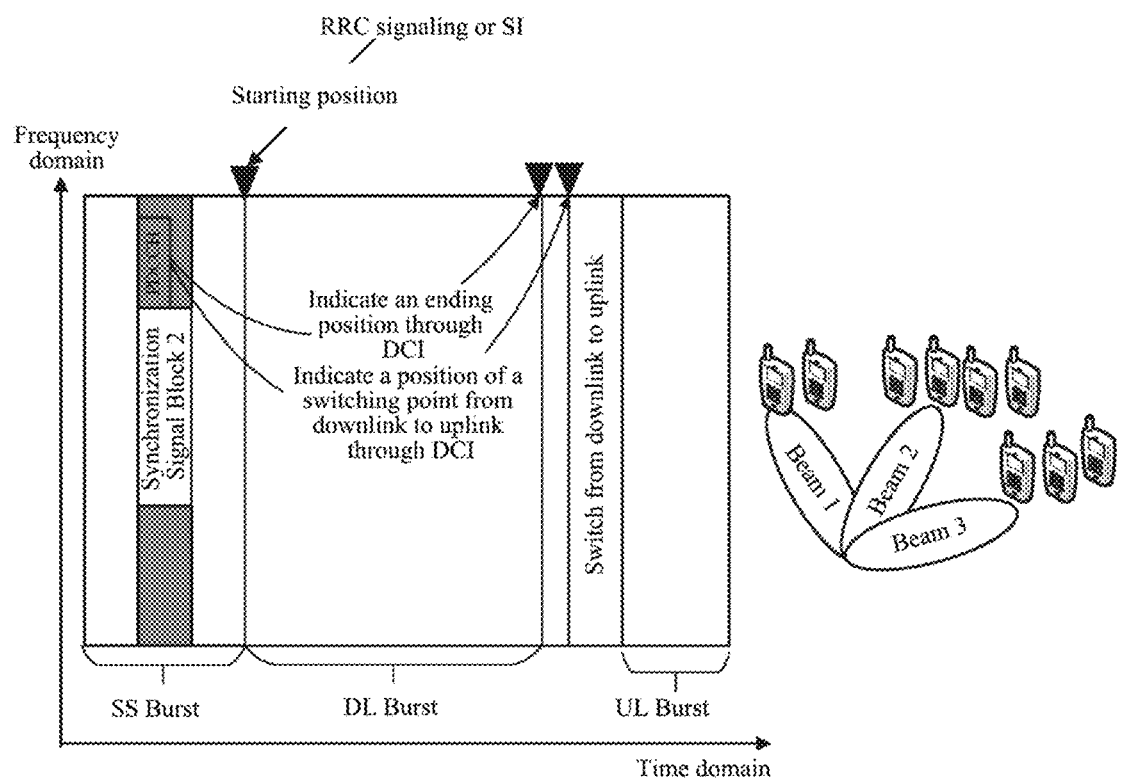
FIG. 8 is a schematic diagram of a method for determining a detection range for a control channel in a multi-beam system according to yet another implementation of the present disclosure.
Figure 9:
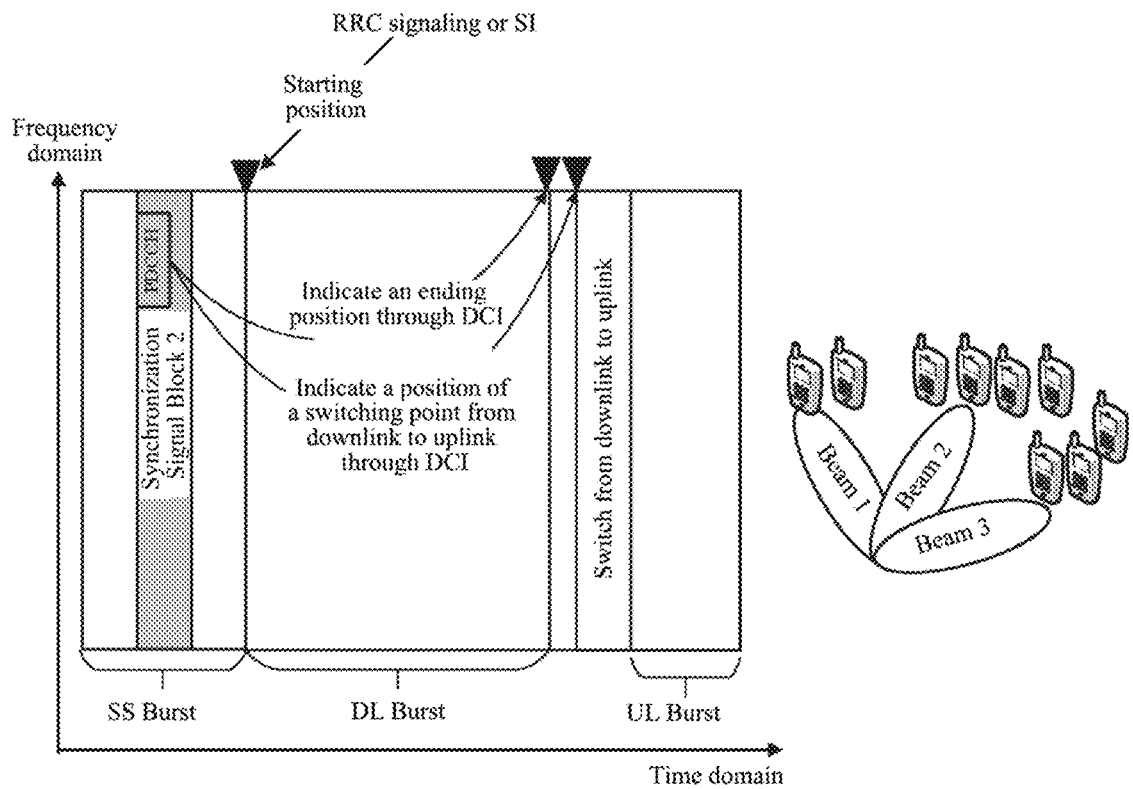
FIG. 9 is a schematic diagram of a method for determining a detection range for a control channel in a multi-beam system according to yet another implementation of the present disclosure.

For example, assuming that a network device sends a signal to a terminal device through three beams, SS Block 1, SS Block 2, and SS Block 3 constitute a SS Burst. As shown in FIG. 8, a SS block may not connect pure data time periods before and after, or as shown in FIG. 9, a SS Block connects pure data time periods before and after. The network device indicates a starting position of a time domain resource that does not include a SS Block through SI or an RRC signaling, and indicates an ending position of a time domain resource that does not include a SS Block or a position of switching point from downlink to uplink through DCI.

Optionally, in S110, the configuration information is used for indicating a second time domain resource within a target downlink time period, and the second time domain resource includes a synchronization signal and a broadcast channel. Thus, the terminal device determines a time domain resource for control channel detection according to the second time domain resource.

Further, no synchronization signal or broadcast channel is included in time domain resources except the second time domain resource within the target downlink time period. That is, the second time domain resource includes all synchronization signals and broadcast channels within the target downlink time period.

Figure 10:
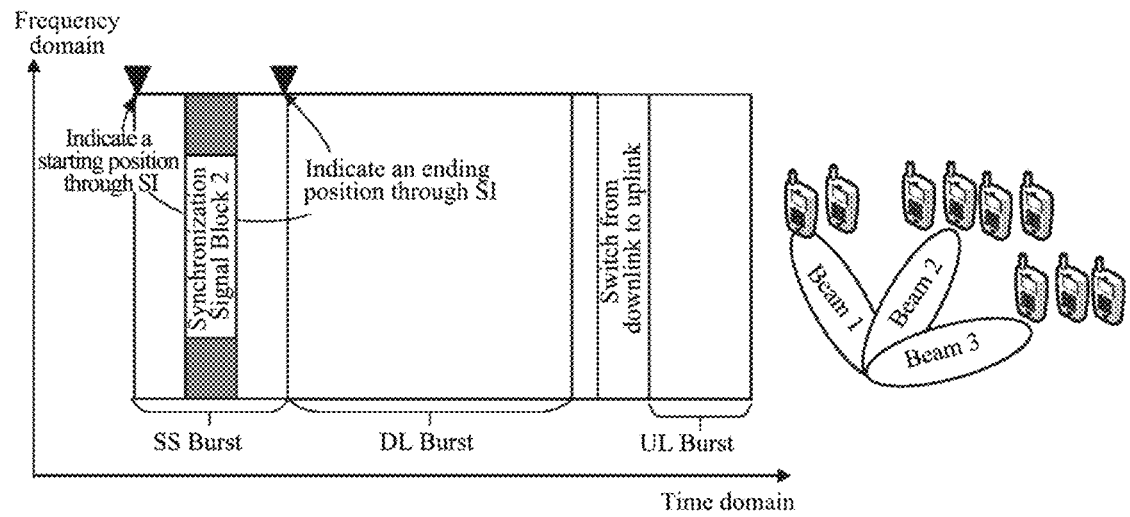
FIG. 10 is a schematic diagram of a method for determining a detection range for a control channel in a multi-beam system according to yet another implementation of the present disclosure.

For example, assuming that a network device sends a signal to a terminal device through three beams, SS Block 1, SS Block 2, and SS Block 3 constitute a SS Burst. As shown in FIG. 10, a SS block may not connect pure data time periods before and after, or as shown in FIG. 11, a SS Block connects pure data time periods before and after. The network device indicates a SS Burst through SI, and the terminal device may calculate a range of a time domain resource that does not include a SS Block after obtaining a time domain range of the SS Burst.

The method for determining a detection range for a control channel in a multi-beam system according to the implementation of the present disclosure has been described in detail from the network device side with reference to FIGS. 1 to 11. Next, a method for determining a detection range for a control channel in a multi-beam system according to an implementation of the present disclosure will be described in detail from the terminal device side with reference to FIG. 12. It should be understood that an interaction between the terminal device and the network device described by the terminal device side is the same as that described by the network device side, and relevant descriptions are omitted appropriately to avoid repetition.

FIG. 12 shows a method for determining a detection range for a control channel in a multi-beam system according to yet another implementation of the present disclosure. As shown in FIG. 12, the method 200 includes acts S210 and S220.

In S210, a terminal device receives configuration information sent by a network device, and the configuration information is used for the terminal device to determine a time domain resource in which control channel detection is required within a target downlink time period according to the configuration information.

In S220, the terminal device determines the time domain resource in which the control channel detection is required within the target downlink time period according to the configuration information, and the time domain resource includes multiple time domain scheduling units.

According to the method for determining the detection range for the control channel in the multi-beam system according to the implementation of the present disclosure, the terminal device receives the configuration information sent by the network device and determines the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources, thereby reducing the complexity and the battery power consumption of the terminal device.

In the implementation of the present disclosure, optionally, the configuration information is used for indicating a first time domain resource within the target downlink time period, the first time domain resource includes multiple first sub-time domain resources, and each first sub-time domain resource does not include a synchronization signal or a broadcast channel.

The act S220 specifically is: the terminal device determines the first time domain resource as a time domain resource in which the control channel detection is required.

In the implementation of the present disclosure, optionally, time domain resources except the first time domain resource within the target downlink time period all include a synchronization signal and a broadcast channel.

The act S210 specifically is: the terminal device receives system information sent by the network device, and the system information includes the configuration information; or, the terminal device receives the configuration information sent by the network device through a broadcast channel.

In the implementation of the present disclosure, optionally, partial time domain resources in time domain resources except the first time domain resource within the target downlink time period do not include a synchronization signal or a broadcast channel.

The act S210 specifically is: the terminal device receives a high layer signaling sent by the network device, and the high layer signaling includes the configuration information; or, the terminal device receives downlink control information (DCI) sent by the network device, and the DCI includes the configuration information; or, the terminal device receives the configuration information sent by the network device through a downlink control channel or a downlink data channel.

In the implementation of the present disclosure, optionally, the multiple first sub-time domain resources are continuous; or at least two of the multiple first sub-time domain resources are discontinuous.

In the implementation of the present disclosure, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

In the implementation of the present disclosure, optionally, the ending position information may indicate the ending position by indicating a time domain position of a switching point from downlink to uplink, and the method 200 further includes: the terminal device determines the time domain position of the switching point from the downlink to the uplink as the ending position of the first time domain resource.

In the implementation of the present disclosure, optionally, at least two pieces of information among information for carrying the starting position information, information for carrying the time domain length information, and information for carrying the ending position information are different; or, at least two channels among a channel for carrying the starting position information, a channel for carrying the time domain length information, and a channel for carrying the ending position information are different.

In the implementation of the present disclosure, optionally, the configuration information is used for indicating a second time domain resource within the target downlink time period, and the second time domain resource includes a synchronization signal and a broadcast channel.

The act S220 specifically is: the terminal device determines a time domain resource except the second time domain resource within the target downlink time period as a time domain resource in which the control channel detection is required.

In the implementation of the present disclosure, optionally, no synchronization signal or broadcast channel is included in time domain resources except the second time domain resource within the target downlink time period.

Figure 13:
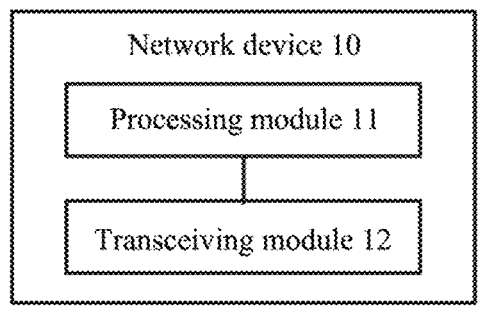
FIG. 13 is a schematic block diagram of a network device according to an implementation of the present disclosure.

The method for determining the detection range for the control channel in the multi-beam system according to the implementation of the present disclosure has been described in detail above with reference to FIGS. 1 to 12. A network device according to an implementation of the present disclosure will be described in detail below with reference to FIG. 13. As shown in FIG. 13, the network device 10 includes a processing module 11 and a transceiving module 12.

The processing module 11 is used for generating configuration information, wherein the configuration information is used for the terminal device to determine a time domain resource in which control channel detection is required within a target downlink time period according to the configuration information, wherein the time domain resource includes multiple time domain scheduling units.

The transceiving module 12 is used for sending the configuration information to the terminal device.

The network device according to the implementation of the present disclosure sends the configuration information to the terminal device, so that the terminal device may determine the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources, thereby reducing the complexity and the battery power consumption of the terminal device.

In the implementation of the present disclosure, optionally, the configuration information is used for indicating a first time domain resource within the target downlink time period, the first time domain resource includes multiple first sub-time domain resources, and each first sub-time domain resource does not include a synchronization signal or a broadcast channel.

In the implementation of the present disclosure, optionally, time domain resources except the first time domain resource within the target downlink time period all include a synchronization signal and a broadcast channel.

The transceiving module 12 is specifically used for sending system information to the terminal device, wherein the system information includes the configuration information; or sending the configuration information to the terminal device through a broadcast channel.

In the implementation of the present disclosure, optionally, partial time domain resources in time domain resources except the first time domain resource within the target downlink time period do not include a synchronization signal or a broadcast channel.

The transceiving module 12 is specifically used for: sending a high layer signaling to the terminal device, wherein the high layer signaling includes the configuration information; or, sending downlink control information (DCI) to the terminal device, wherein the DCI includes the configuration information; or, sending the configuration information to the terminal device through a downlink control channel or a downlink data channel.

In the implementation of the present disclosure, optionally, the multiple first sub-time domain resources are continuous; or at least two of the multiple first sub-time domain resources are discontinuous.

In the implementation of the present disclosure, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

In the implementation of the present disclosure, optionally, the ending position information may indicate the ending position by indicating a time domain position of a switching point from downlink to uplink.

In the implementation of the present disclosure, optionally, at least two pieces of information among information for carrying the starting position information, information for carrying the time domain length information, and information for carrying the ending position information are different; or, at least two channels among a channel for carrying the starting position information, a channel for carrying the time domain length information, and a channel for carrying the ending position information are different.

In the implementation of the present disclosure, optionally, the configuration information is used for indicating a second time domain resource within the target downlink time period, and the second time domain resource includes a synchronization signal and a broadcast channel.

In the implementation of the present disclosure, optionally, no synchronization signal or broadcast channel is included in time domain resources except the second time domain resource within the target downlink time period.

The network device according to the implementation of the present disclosure may refer to a flow of the method 100 corresponding to the implementation of the present disclosure, and various units/modules in the network device and the other operations and/or functions are respectively in order to realize the corresponding flow in the method 100, and will not be repeated here for brevity.

Figure 14:
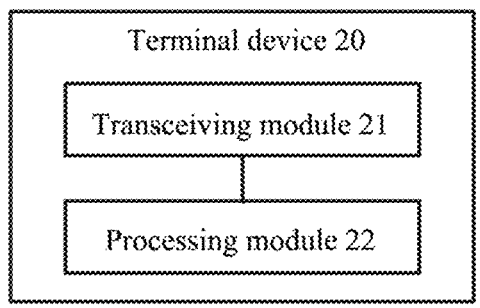
FIG. 14 is a schematic block diagram of a terminal device according to an implementation of the present disclosure.

FIG. 14 shows a terminal device according to an implementation of the present disclosure. As shown in FIG. 14, the terminal device 20 includes a transceiving module 21 and a processing module 22.

The transceiving module 21 is used for receiving configuration information sent by a network device, wherein the configuration information is used for the terminal device to determine a time domain resource in which control channel detection is required within a target downlink time period according to the configuration information.

The processing module 22 is used for determining the time domain resource in which the control channel detection is required within the target downlink time period according to the configuration information, wherein the time domain resource includes multiple time domain scheduling units.

The terminal device according to the implementation of the present disclosure receives the configuration information sent by the network device and determines the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources, thereby reducing the complexity and the battery power consumption of the terminal device.

In the implementation of the present disclosure, optionally, the configuration information is used for indicating a first time domain resource within the target downlink time period, the first time domain resource includes multiple first sub-time domain resources, and each first sub-time domain resource does not include a synchronization signal or a broadcast channel; the processing module 22 is specifically used for: determining the first time domain resource as the time domain resource in which the control channel detection is required.

In the implementation of the present disclosure, optionally, time domain resources except the first time domain resource within the target downlink time period all include a synchronization signal and a broadcast channel.

The transceiving module 21 is specifically used for: receiving system information sent by the network device, wherein the system information includes the configuration information; or, receiving the configuration information sent by the network device through a broadcast channel.

In the implementation of the present disclosure, optionally, partial time domain resources in time domain resources except the first time domain resource within the target downlink time period do not include a synchronization signal or a broadcast channel.

The transceiving module 21 is specifically used for: receiving a high layer signaling sent by the network device, wherein the high layer signaling includes the configuration information; or, receiving downlink control information (DCI) sent by the network device, wherein the DCI includes the configuration information; or, receiving the configuration information sent by the network device through a downlink control channel or a downlink data channel.

In the implementation of the present disclosure, optionally, the multiple first sub-time domain resources are continuous; or at least two of the multiple first sub-time domain resources are discontinuous.

In the implementation of the present disclosure, the configuration information includes at least one of starting position information, time domain length information, and ending position information, wherein the starting position information is used for indicating a starting position of a first time domain resource or each first sub-time domain resource, the time domain length information is used for indicating a time domain length of the first time domain resource or each first sub-time domain resource, and the ending position information is used for the terminal device to determine an ending position of the first time domain resource or each first sub-time domain resource according to the ending position information.

In the implementation of the present disclosure, optionally, the ending position information indicates the ending position by indicating a time domain position of a switching point from downlink to uplink, and the processing module 22 is further used for determining the time domain position of the switching point from the downlink to the uplink as the ending position of the first time domain resource.

In the implementation of the present disclosure, optionally, at least two pieces of information among information for carrying the starting position information, information for carrying the time domain length information, and information for carrying the ending position information are different; or, at least two channels among a channel for carrying the starting position information, a channel for carrying the time domain length information, and a channel for carrying the ending position information are different.

In the implementation of the present disclosure, optionally, the configuration information is used for indicating a second time domain resource within the target downlink time period, and the second time domain resource includes a synchronization signal and a broadcast channel.

The processing module 22 is specifically used for: determining a time domain resource except the second time domain resource within the target downlink time period as a time domain resource in which the control channel detection is required.

In the implementation of the present disclosure, optionally, no synchronization signal or broadcast channel is included in time domain resources except the second time domain resource within the target downlink time period.

The terminal device according to the implementation of the present disclosure may refer to a flow of the method 200 corresponding to the implementation of the present disclosure, and various units/modules in the terminal device and the other operations and/or functions are respectively in order to realize the corresponding flow in the method 200, and will not be repeated here for brevity.

Figure 15:
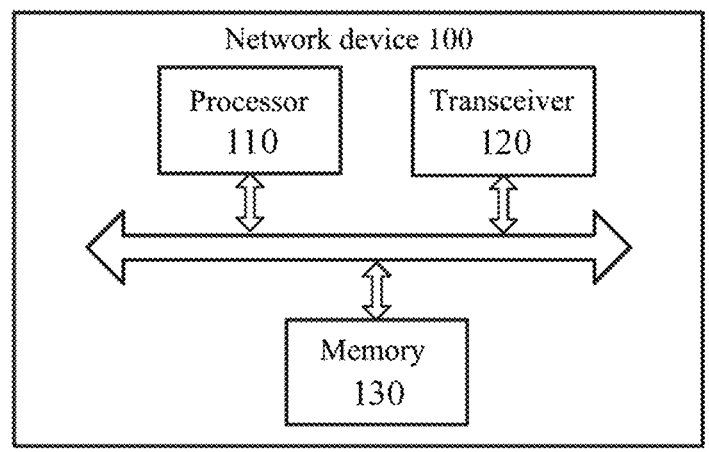
FIG. 15 is a schematic block diagram of a network device according to another implementation of the present disclosure.

FIG. 15 shows a network device according to another implementation of the present disclosure. As shown in FIG. 15, the terminal device 100 includes a processor 110 and a transceiver 120, and the processor 110 is connected to the transceiver 120. Optionally, the terminal device 100 further includes a memory 130, and the memory 130 is connected to the processor 110. Herein, the processor 110, the memory 130, and the transceiver 120 may communicate with each other through internal connection paths. The processor 110 is used for generating configuration information, wherein the configuration information is used for a terminal device to determine a time domain resource in which control channel detection is required within a target downlink time period according to the configuration information, and the time domain resource includes multiple time domain scheduling units; and the transceiver 120 is used for sending the configuration information to the terminal device.

Therefore, the network device according to the implementation of the present disclosure sends the configuration information to the terminal device, so that the terminal device may determine the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources, thereby reducing the complexity and the battery power consumption of the terminal device.

The network device 100 according to the implementation of the present disclosure may refer to the network device 10 corresponding to the implementation of the present disclosure, and various units/modules in the network device and the other operations and/or functions are respectively in order to realize the corresponding flow in the method 100, and will not be repeated here for brevity.

Figure 16:
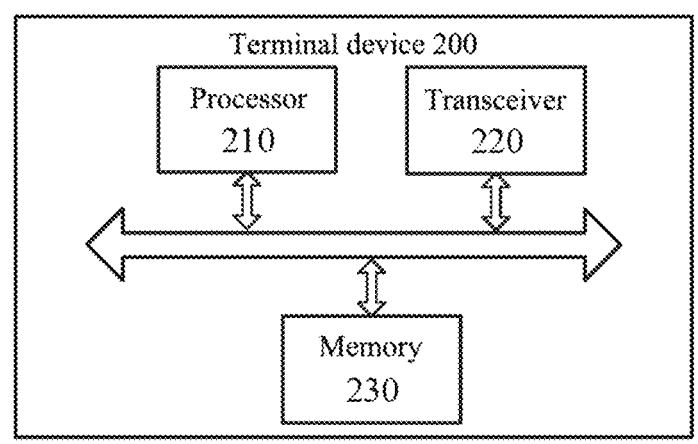
FIG. 16 is a schematic block diagram of a terminal device according to another implementation of the present disclosure.

FIG. 16 shows a schematic block diagram of a terminal device according to another implementation of the present disclosure. As shown in FIG. 16, the terminal device 200 includes a processor 210 and a transceiver 220, the processor 210 is connected to the transceiver 220, and optionally, the terminal device 200 further includes a memory 230 connected to the processor 210. Herein, the processor 210, the memory 230, and the transceiver 220 may communicate with each other through internal connection paths. The transceiver 220 is used for receiving configuration information sent by a network device, and the configuration information is used for the terminal device to determine a time domain resource in which control channel detection is required within a target downlink time period according to the configuration information. The processor 210 is used for determining the time domain resource in which the control channel detection is required within the target downlink time period according to the configuration information, and the time domain resource includes multiple time domain scheduling units.

Therefore, the terminal device according to the implementation of the present disclosure receives the configuration information sent by the network device and determines the time domain resource in which the control channel detection is required according to the configuration information. Therefore, in the multi-beam system, the terminal device only needs to perform the detection of control channel on the time domain resource determined according to the configuration information, and those time domain resources (such as time domain scheduling units where synchronization signals or broadcast signals of other beams are located) on which a control channel of a current beam is determined not to exist, may be excluded through the configuration information, so that the terminal device avoids detecting these part of time domain resources, thereby reducing the complexity and the battery power consumption of the terminal device.

The terminal device 200 according to the implementation of the present disclosure may refer to the terminal device 20 corresponding to the implementation of the present disclosure, and various units/modules in the terminal device and the other operations and/or functions are respectively in order to realize the corresponding flow in the method 200, and will not be repeated here for brevity.

It should be understood that the processor in the implementations of the present disclosure may be an integrated circuit chip with a capability for processing signals. The above processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in implementations of the present disclosure. The general purpose processor may be a microprocessor, or the processor may be any conventional processor or the like.

It should be understood that the memory in the implementations of the present disclosure may be a transitory memory or non-transitory memory, or may include both transitory and non-transitory memory. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example, but not as a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but not limited to, these and any other suitable types of memories.

Those of ordinary skill in the art will recognize that the exemplary elements and algorithm acts described in combination with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the purpose of the implementations.

In addition, various functional units in various implementations of the present disclosure may be integrated in one processing unit, or the various units may be physically present separately, or two or more units may be integrated in one unit.

The functions may be stored in a computer readable storage medium if realized in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device and the like) to perform all or part of the acts of the method described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A method for determining a detection range for a control channel in a multi-beam system, comprising:
sending, by a network device, configuration information to a terminal device, wherein, the configuration information is used for indicating a second time domain resource;
wherein the second time domain resource is used for the terminal device to determine a time domain resource in which control channel detection is required within a target downlink time period according to the second time domain resource, and the second time domain resource comprises a synchronization signal and a broadcast channel, and the time domain resource comprises multiple time domain scheduling units; and
wherein determining a time domain resource in which control channel detection is required within a target downlink time period according to the second time domain resource comprises:
determining the time domain resource in which control channel detection is required within the target downlink time period by excluding the second time domain resource.

2. The method according to claim 1, wherein the time domain scheduling unit comprises a slot or a mini-slot.

3. The method according to claim 1, wherein the configuration information is a Radio Resource Control (RRC) signaling or system information (SI).

4. The method according to claim 1, wherein the configuration information comprises at least one of starting position information, time domain length information, and ending position information.

5. A method for determining a detection range for a control channel in a multi-beam system, comprising:
receiving, by a terminal device, configuration information sent by a network device, wherein, the configuration information is used for indicating a second time domain resource; wherein the second time domain resource is used for the terminal device to determine a time domain resource in which control channel detection is required within a target downlink time period according to the second time domain resource; and
determining, by the terminal device, the time domain resource in which the control channel detection is required within the target downlink time period according to the second time domain resource, wherein second time domain resource comprises a synchronization signal and a broadcast channel, and the time domain resource comprises multiple time domain scheduling units;
wherein determining a time domain resource in which control channel detection is required within a target downlink time period according to the second time domain resource comprises:
determining the time domain resource in which control channel detection is required within the target downlink time period by excluding the second time domain resource.

6. The method according to claim 5, wherein the time domain scheduling unit comprises a slot or a mini-slot.

7. The method according to claim 5, wherein the configuration information is a Radio Resource Control (RRC) signaling or system information (SI).

8. The method according to claim 5, wherein the configuration information comprises at least one of starting position information, time domain length information, and ending position information.

9. A network device, comprising a processor and a transceiver,
wherein the processor is used for generating configuration information, wherein the configuration information is used for indicating a second time domain resource, the second time domain resource is used for the terminal device to determine a time domain resource in which control channel detection is required within a target downlink time period according to the second time domain resource, and the second time domain resource comprises a synchronization signal and a broadcast channel, and the time domain resource comprises multiple time domain scheduling units;
wherein the transceiver is used for sending the configuration information to the terminal device; and
wherein determining a time domain resource in which control channel detection is required within a target downlink time period according to the second time domain resource comprises:
determining the time domain resource in which control channel detection is required within the target downlink time period by excluding the second time domain resource.

10. The network device according to claim 9, wherein the time domain scheduling unit comprises a slot or a mini-slot.

11. The network device according to claim 9, wherein the configuration information is a Radio Resource Control (RRC) signaling or system information (SI).

12. The network device according to claim 9, wherein the configuration information comprises at least one of starting position information, time domain length information, and ending position information.

* * * * *